(12) United States Patent
Webster et al.

(10) Patent No.: US 11,309,769 B2
(45) Date of Patent: Apr. 19, 2022

(54) METHOD AND SYSTEM FOR GENERATING ELECTRICITY FROM FOOTSTEPS

(71) Applicant: PAVEGEN SYSTEMS LIMITED, London (GB)

(72) Inventors: Craig Webster, London (GB); Ben Gordon, London (GB)

(73) Assignee: PAVEGEN SYSTEMS LIMITED, London (GB)

(*) Notice: Subject to any disclaimer, the term of this patent is extended or adjusted under 35 U.S.C. 154(b) by 755 days.

(21) Appl. No.: 16/300,505

(22) PCT Filed: May 10, 2017

(86) PCT No.: PCT/GB2017/051296
§ 371 (c)(1),
(2) Date: Nov. 9, 2018

(87) PCT Pub. No.: WO2017/194936
PCT Pub. Date: Nov. 16, 2017

(65) Prior Publication Data
US 2019/0238028 A1 Aug. 1, 2019

(30) Foreign Application Priority Data
May 10, 2016 (GB) .................................. 1608199

(51) Int. Cl.
*H02K 7/06* (2006.01)
*H02K 7/18* (2006.01)
*H02K 7/02* (2006.01)

(52) U.S. Cl.
CPC .......... *H02K 7/1853* (2013.01); *H02K 7/025* (2013.01); *H02K 7/06* (2013.01)

(58) Field of Classification Search
CPC ......... H02K 7/025; H02K 7/06; H02K 7/1853
See application file for complete search history.

(56) References Cited

U.S. PATENT DOCUMENTS 4,614,875 A 9/1986 McGee
4,912,995 A 4/1990 Otters
(Continued)

FOREIGN PATENT DOCUMENTS

| CN | 102042156 | 5/2011 |
| EP | 2478622 | 7/2012 |
| GB | 1516234 A | 6/1978 |

(Continued)

*Primary Examiner* — Ramon M Barrera
(74) *Attorney, Agent, or Firm* — Jason P. Mueller; FisherBroyles, LLP

(57) ABSTRACT

A disclosed electrical generator includes a housing, an actuator, a rotatable member, a stator, a rotor, an electrical circuit, and a current controller. The actuator is movable relative to the housing and the rotatable member is also rotatable relative to the housing. The rotatable member cooperates with the actuator such that movement of the actuator causes rotation of the rotatable member. The stator is fixed relative to the housing and the rotor receives rotational kinetic energy from the rotatable member. Movement of the rotor relative to the stator generates electromagnetic induction in the rotor and/or the stator which produces a three-phase alternating current. The electrical circuit includes a rectifier that converts the alternating current to a direct current. The current controller regulates the direct current to thereby generate a fixed constant direct current.

17 Claims, 4 Drawing Sheets

(56) References Cited

U.S. PATENT DOCUMENTS

2004/0257050 A1    12/2004    Zeller
2009/0085531 A1     4/2009    Ooiwa

FOREIGN PATENT DOCUMENTS

| GB | 2542203 | 3/2017 |
| GB | 2558516 | 7/2018 |
| WO | 2011138585 A1 | 11/2011 |
| WO | 2017194936 | 11/2017 |

METHOD AND SYSTEM FOR GENERATING ELECTRICITY FROM FOOTSTEPS

This application is a 371 of PCT Patent Application No. PCT/GB2017/051296, filed May 10, 2017, which claims the benefit of GB Patent Application No. 1608199.4, filed May 10, 2016, the entire contents of each of which are hereby incorporated by reference.

BACKGROUND

The disclosure relates to a generator for generating electricity from impulse forces that may be harnessed from pedestrians or other traffic moving on a surface.

WO 2011/138585 discloses a motion converter which converts linear displacements caused by traffic-related impulse forces, to be converted to rotational motion for driving the rotor of an electricity generator.

UK patent application GB 1516234.0 discloses a flooring system that employs linear displacement electrical generators for converting impulse forces that land on the flooring system into electrical energy.

Since linear displacements derivable from traffic-related impulses may be intermittent and each may be of the order of 5 to 10 mm, there is a desire to improve efficiency of conversion of each linear displacement to electricity generated.

SUMMARY OF DISCLOSURE

According to the disclosure, there is provided electrical generator configured to convert kinetic energy into electrical energy, the electrical generator comprising:
a housing;
an actuator movable relative to the housing;
a rotatable member being rotatable relative to the housing and configured to cooperate with the actuator such that movement of the actuator causes rotation of the rotatable member;
a stator fixedly attached to the housing;
a rotor configured to receive rotational kinetic energy from the rotatable member;
wherein the rotor and stator are configured to interact such that rotation of the rotor relative to the stator results in electromagnetic induction in the rotor and/or the stator which produces three-phase alternating current; and
wherein the electrical generator further includes:
an electronic circuit comprising a rectifier configured to convert the alternating current to direct current; and
a current controller configured to regulate the direct current to be a fixed constant current.

The electrical generator may be configured to convert axial kinetic energy into electrical energy. The actuator may be movable axially relative to the housing. The rotatable member may be configured to cooperate with the actuator such that axial movement of the actuator causes rotation of the rotatable member.

BRIEF DESCRIPTION OF THE DRAWINGS

For a better understanding of the disclosure, and to show how the same may be put into effect, reference is now made, by way of example only, to the accompanying drawings in which.

DETAILED DESCRIPTION OF AN ELECTRICAL GENERATOR IN ACCORDANCE WITH THE DISCLOSURE

Figure 1:
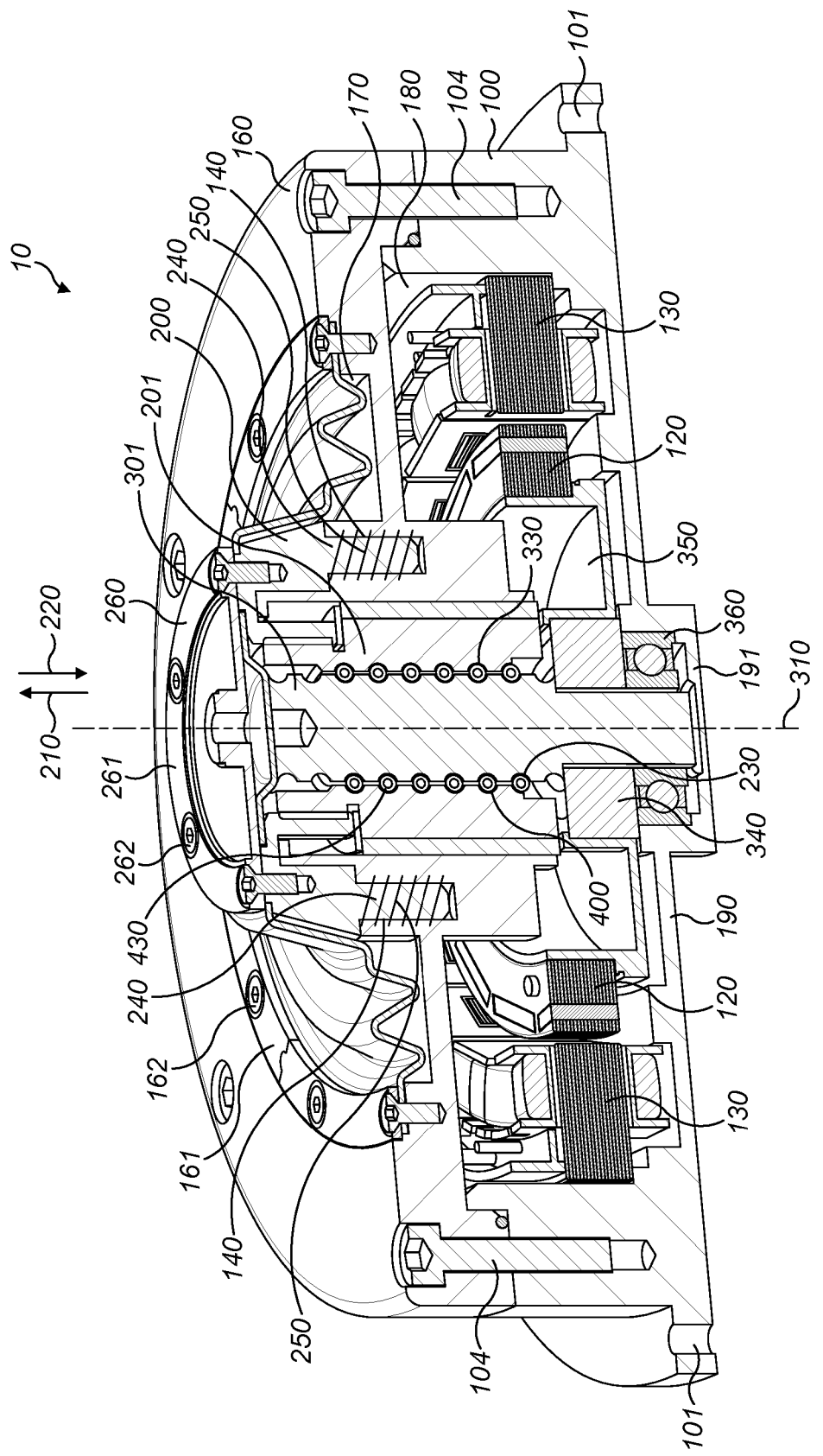
FIG. 1 shows a cross-sectional representation of an electrical generator in accordance with the disclosure.

FIG. 1 shows a first embodiment of an electrical generator 10 in accordance with the disclosure.

As can be seen in FIG. 1, the electrical generator 10 includes a housing 100, an actuator 200 and a rotatable member 300. Each generator 10 further includes a rotor 120 and a stator 130.

The housing 100 includes an annular surround 160 that surrounds a substantially circular aperture 170 through which part of the actuator 200 projects. The annular surround 160 has an upper surface that lies in a first plane of the electrical generator 10 and the actuator 200 projects in an axial direction having an axis that is substantially orthogonal to the first plane.

The actuator 200 is operatively engaged to the rotatable member 300 such that axial movement of the actuator 200 in the axial direction results in rotational movement of the rotatable member 300 about the axis, as explained in more detail below.

The actuator 200 is biased in a first axial direction 210 (which is upward in the orientation of FIG. 1) and electricity is generated as a result of movement of the actuator 200 in a second axial direction 220 which is opposite the first axial direction 210 (and is downward in the orientation of FIG. 1). In FIG. 1, the actuator 200 is positioned in its lowermost (actuated) position relative to the housing 100. Accordingly, the actuator 200 is at the end of its travel in the second axial direction 220 and acting against the biasing in the first axial direction 210.

The actuator 200 includes an actuation surface 260 configured to receive a force (directly or indirectly) by which the actuator 200 is caused to move axially in the second axial direction 220.

The annular surround 160 covers an annular cavity 180 in which the stator 120 and the rotor 130 are located. The stator 120 is fixedly attached within the annular cavity 180 so as to prevent movement of the stator 120 relative to the housing 100, whether axial or rotational. The rotor 130 is located radially within the stator 120 such that the rotor 130 is rotatable but its axial position is fixed. The rotor 130 is located at a periphery of a flywheel 350.

As the skilled person would readily appreciate, it may be appropriate in alternative embodiments to reverse the positions of the stator 120 and the rotor 130 such that the rotor 130 is radially outside the stator 120.

The rotatable member 300 is configured to engage with the flywheel 350 via a clutch arrangement 340 such that rotational movement of the rotatable member 300 is transferrable to rotational movement of the flywheel 350 which means that the rotor 130 rotates relative to the stator 120. Suitable arrangements of magnets and coils may be provided (not shown) on the stator 120 and the rotor 130 to generate electricity from the rotation of the rotor.

In the illustrated embodiment of FIG. 1, the rotatable member 300 includes a ball screw 301 and the actuator 200 includes a ball nut 201.

A plurality of balls 400 (e.g. ball bearings) is located in a helical channel 430 between the ball screw 301 and the ball nut 201. In this way, the plurality of balls 400 reduces an amount of friction that would result from using a conventional screw and nut combination in the same context. Furthermore, a shallower thread angle is possible than with a conventional screw and nut combination.

The helical channel 430 is formed from a combination of a first helical groove 330 in the ball screw 301 and a second helical groove 230 in the ball nut 201. The first helical groove 330 complements the second helical groove 230 such that together they form the helical channel 430 having a circular cross section for accommodating the plurality of balls 400.

As the skilled person would readily appreciate, in alternative embodiments (not shown), it may be that the rotatable member 300 includes a ball nut and that the actuator 200 includes a ball screw.

The actuator 200 further includes a plurality of pins 240 each pin extending in a direction parallel to the first and second axial directions 210, 220. The housing 100 includes a plurality of apertures 140, each of the apertures 140 being configured to receive one of the plurality of pins 240. Each pin 240 and its respective aperture 140 is located radially outward relative to the rotatable member 300. The pins 240 are distributed evenly around the actuator 200.

The pins 240 and apertures 140 may act to retain the relative positions of the actuator 200 relative to the housing 100. Furthermore, the pins 240 and apertures 140 may prevent or at least reduce the likelihood of the actuator 200 moving other than in a direction that is in the axial direction. For each pin 240 and its corresponding aperture 140, a biasing member 140, in particular a spring 140, is located between the pin 240 and the aperture 140 such that the actuator 200 returns to an upper position once a force is removed from the actuator 200.

The biasing members 250 may each be a helical spring that may for example be torsional or compressional.

As the skilled person would readily appreciate, in alternative embodiments (not shown), it may be that the pins are located in the housing 100 and that the apertures are located in the actuator 200.

As mentioned above, the electrical generator includes a clutch arrangement 340 between the rotatable member 300 and the rotor 120.

In the illustrated embodiment, the clutch arrangement 340 includes an overrunning sprag clutch that allows continued rotation of the rotor 120 by inertia after rotation of the rotatable member 300 concludes. The length of axial movement of the actuator 200 combined with the screw pitch of the ball screw and ball nut are such that full axial travel of the actuator 200 from an uppermost position to a lowermost position is 10 mm and converts to approximately 720° of rotation of the rotatable member 300. By using an overrunning sprag clutch 340 that drives a flywheel 350 on which the rotor 120 is mounted, rotation of the flywheel 350 (and hence the rotor 120 may continue after the actuator 200 changes direction in response to biasing forces applied by the helical springs 140 to move the actuator 200 upwardly once a force on the actuator surface 260 is removed. Accordingly, the flywheel 350 may rotate for considerably more than 720° of rotation and thereby for a longer period of time.

Without a clutch, the rotor 120 would switch direction of rotation when switching between the downward and the upward strokes of the actuator 200. Furthermore, the presence of the flywheel 350 is such as to increase a period of time for which the rotor 120 passes the stator 130.

The electrical generator 10 of the illustrated embodiment further includes a deep-groove bearing 360 that is located in a recess 191 in a bottom surface 190 of the housing 100 furthest from the actuator surface 260. The deep-grove bearing 360 is configured to facilitate rotation of the rotatable member 300 relative to the housing 100 whilst preventing axial movement of the rotatable member 300. The term deep-grove bearing 360 is known to the skilled person as referring to a type of bearing that resists axial movement of a rotatable member that rotates relative to the bearing. In short, given that inner and outer portions of the bearing include deep grooves to hold balls of the bearing in place, axial movement of the rotating member is substantially prevented.

The housing 100 further includes apertures 101 configured to accommodate an attachment device (not shown) by which the electrical generator 10 may be attached to a surface such as an existing floor.

A flexible gasket 150 is provided between a radially exterior perimeter of the actuation surface 260 and a radially interior perimeter of the annular surround 160 of the housing 100. In this way, a gap between the radially exterior perimeter of the actuation surface 260 and the radially interior perimeter of the annular surround 160 is filled by the flexible gasket 150 at all axial positions of the actuator 200.

The flexible gasket 150 may be fastened to the annular surround 160 by a first gasket ring 161 that is fixedly attached to a perimeter of the annular surround 160 by a plurality of fastenings 162 such that the flexible gasket 150 is held between the annular surround 160 and the first gasket ring 161.

Similarly, the flexible gasket 150 may be fastened to the actuator surface 260 by a second gasket ring 261 that is fixedly attached to a perimeter of the actuation surface 260 by a plurality of fastenings 262 such that the flexible gasket 150 is held between the actuator surface 260 and the second gasket ring 261.

The flexible gasket 150 may include or be formed of: rubber; neoprene; TPV; TPE; and/or a polymeric material.

The housing 100 may include an upper housing 102 and a lower housing 103 such that the annular cavity 180 is formed between the upper and lower housings 102, 103. The upper and lower housings 102, 103 are fastened together by conventional fasteners 104 such as threaded bolts and correspondingly threaded holes.

In a variation on the first embodiment, that is not illustrated, the electrical generator may further include a ball return channel that connects a first end of the helical channel with a second end of the helical channel opposite the first end. In this way, balls may constantly circulate around a closed loop formed by the helical channel and the ball return channel.

In still further variations on the first embodiment, the electrical generator may include a plurality of helical channels distributed lengthwise along the ball screw. Each of the plurality of helical channels may include its own ball return channel that connects a first end of its helical channel with a second end of its helical channel opposite the first end.

The electrical generator 10 may further include two or more adjustable feet (not shown) extending from the housing 105 to allow its height and orientation to be adjusted.

The actuation surface 260 may include a plurality of pivots (not shown) via which one of a plurality of tiles 20 may be supported as explained further below. Each pivot may allow one tile 20 to tilt relative to the actuation surface 260, and also to slide relative to the actuation surface 260.

The actuation surface 260 may include a support gasket (not shown) which may be made of resilient material to muffle the sound of footsteps. The gasket includes or is formed of: rubber; neoprene; TPV; TPE; and/or a polymeric material. Tiles 20 may be supported on the support gasket.

In some embodiments, the support gasket includes a plurality of rollers. The rollers may be seated in complementarily-shaped indents in the actuation surface 260. Rollers may be any suitable shape, e.g. cylindrical, but in some embodiments are spherical or generally spherical. The rollers are complementary to the indents in the tiles 20. The rollers and indents can allow rotation of the tile 20 in multiple degrees of freedom.

Screw pitch is defined as a distance from the crest of one thread to the next an axial direction. In the context of a ball screw, therefore, screw pitch is a distance at one radial position at an exterior of the screw between one position in the helical channel and an adjacent position in the helical channel.

In the event that the screw pitch is too small, friction may prevent rotation of the screw in response to axial movement of the actuator 200 altogether. In the event that screw pitch is large, the amount of rotational movement that is generated by axial movement of the actuator 200 is too small only a small rotation of the rotor 120 will be produced which limits the amount of electricity generated.

Figure 3:
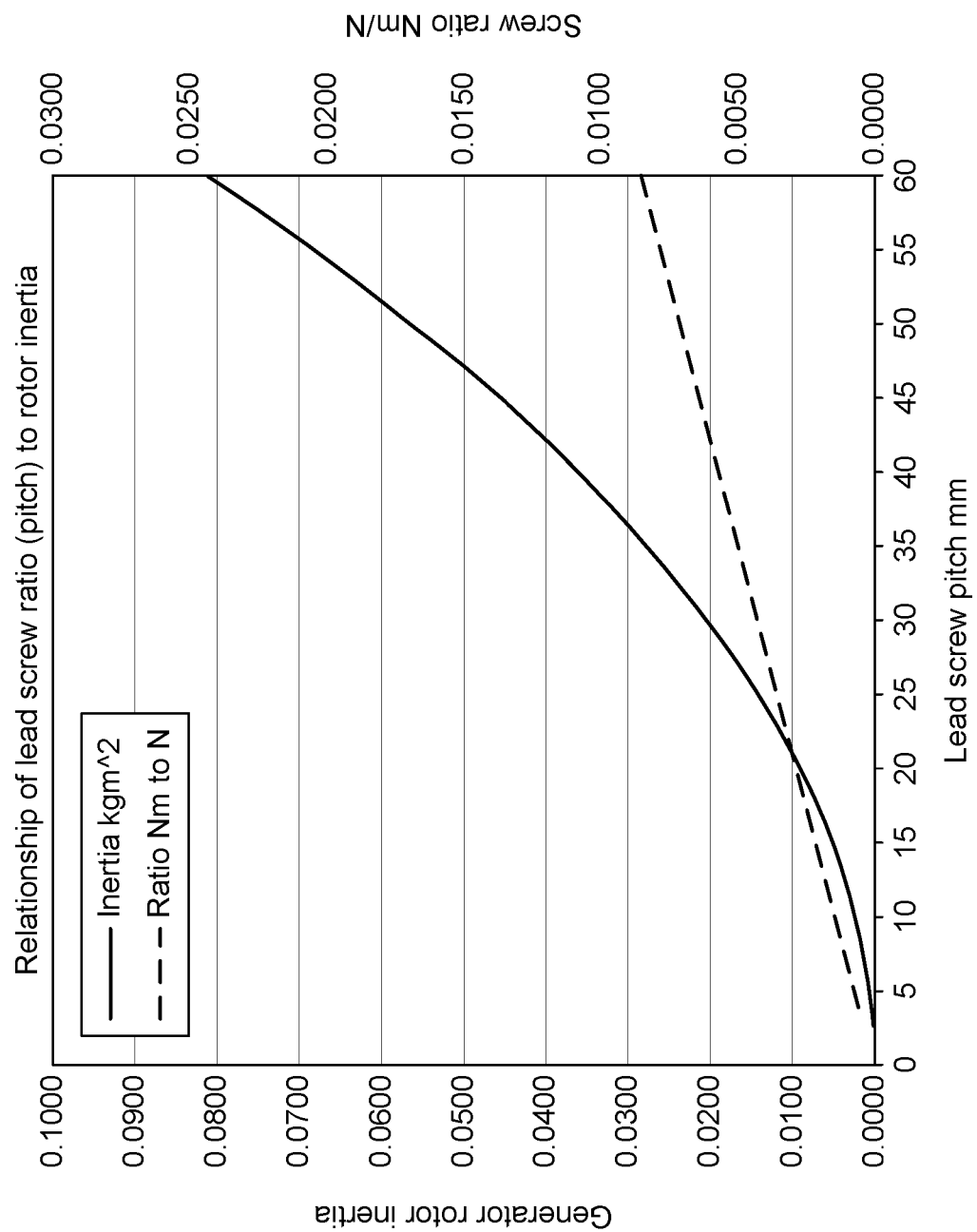
FIG. 3 shows a graph showing relationships between properties of a ball screw and generator rotor moment of inertia.
Figure 4:
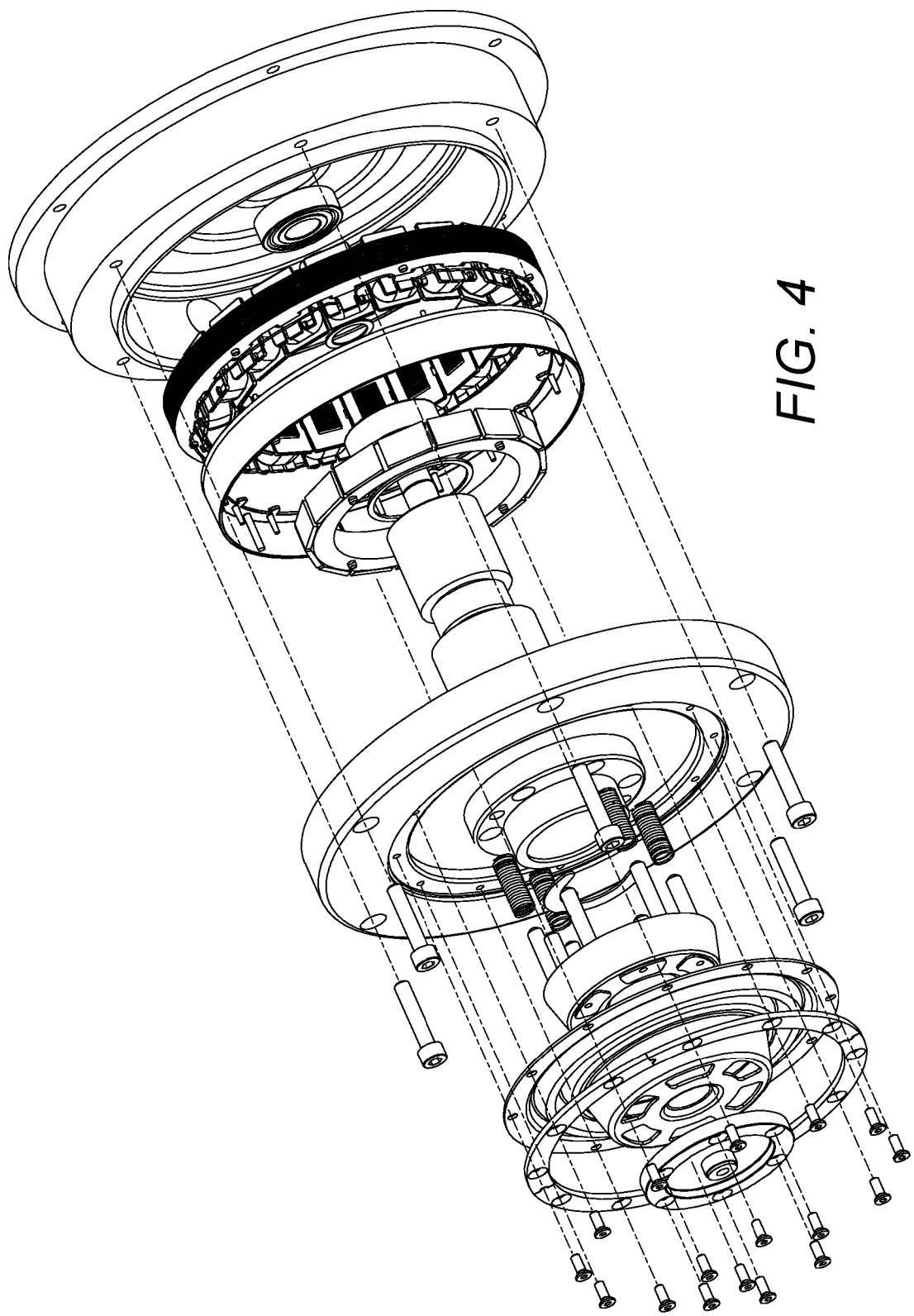
FIG. 4 shows an exploded view of the electrical generator of FIG. 1.

FIG. 3 shows the relationship of rotor inertia (which scales with cost) to screw pitch in order to accelerate the rotor to a constant kinetic energy from a pulse of constant force input. The constant kinetic energy may be 3.7 J. A screw pitch of 10 mm is shown to result in 0.0014 Nm of torque per N of axial force. A screw pitch of 5 mm is shown to result in 0.0007 Nm of torque per N of axial force.

In one embodiment, the screw diameter is 16 mm, the screw pitch is 5 mm, the maximum length of travel of the actuator 200 is 10 mm and the length of time over which energy is obtained from an impulse force on the generator is 200 ms. The resulting torque is 0.0007 Nm per N of axial force.

As is well known, electromagnetic induction results when coils pass through a magnetic field. The movement of rotor coils relative to stator coils thereby results in electromagnetic induction.

The electrical generator may be configured such that alternating current is produced. For example, three-phase alternating current may be produced. The alternating current may be rectified to produce a direct current output.

As a consequence of the relatively short travel of the actuator 300 and the nature of the actuation force being that of an impulse and the eddy currents flowing in the windings, the properties of the electromagnetic induction may be highly variable.

The applicant has determined that efficiency can be significantly improved by using the generator to produce a fixed constant current. In doing so, the voltage induced in the coils and the speed of rotation of the rotor may be allowed to vary considerably in order to achieve the fixed constant current. For example, for a fixed constant current of 350 mA, voltage may be allowed to vary between 3 V and 100 V.

Using the generator to produce a fixed constant current in this way has been found to minimise $I^2R$ losses in the windings of the stator and/or rotor and, furthermore, to minimise frictional losses.

Implementation of the fixed constant current output may be achieved by use of a flyback converter.

Figure 2:
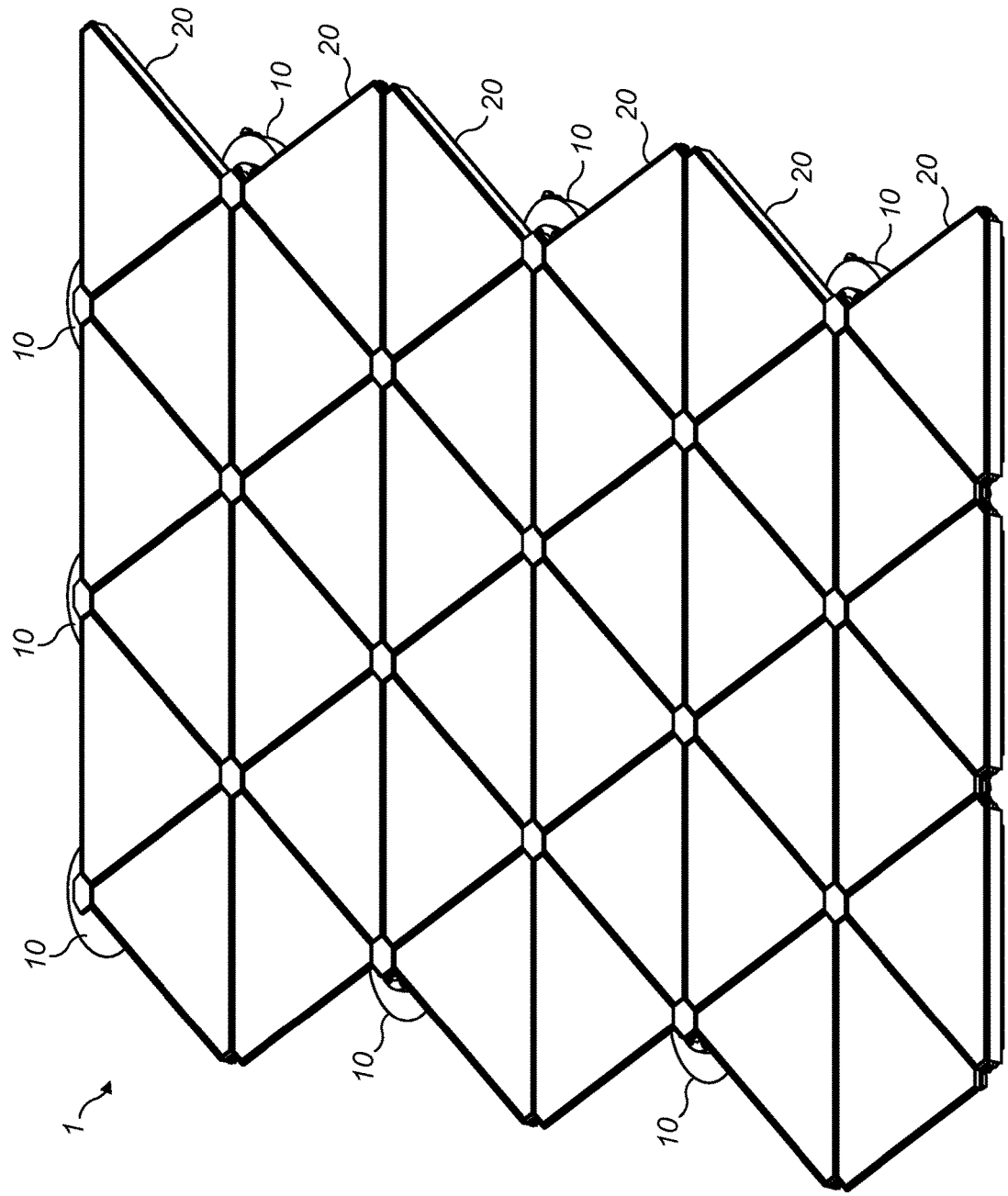
FIG. 2 shows a perspective view of part of a flooring system including a plurality of electrical generators and a plurality of triangular tiles.

The fixed constant current may be between 150 mA and 500 mA, or may be between 350 mA and 400 mA. Description of a flooring system comprising the electrical generator FIG. 2 shows a flooring system that makes use of a plurality of electrical generators 10 and a plurality of tiles 20. In this embodiment, the floor tiles 20 are triangular and are arranged in a tessellated pattern. The plurality of tiles collectively defines a floor surface on which people may walk or vehicles may pass.

Each generator 10 includes a housing 100 and an actuator 200 that is movable with respect to the housing 100. Each generator 10 is arranged to generate electricity from linear motion of its actuator 200 relative to the housing 100 in a downward direction in an orientation of use. Each actuator 200 is biased in an upward direction in an orientation of use to provide a restoring force following displacement.

As can be seen from FIG. 2, each generator 10 supports a plurality of tiles 20. As a user walks across the tiles 20, the support 10 will be displaced from an equilibrium position. This will generate electricity using the generator 10, as explained in more detail below. The support 10 will then be returned to the equilibrium position by the biasing device (described in detail later in relation to FIG. 2). The support 10 will move only over small distance so as to avoid an unpleasant sensation for the user. However, the cumulative effect of many steps from many users over a large area can generate a significant amount of electricity.

The tiles 20 are pivotably supported by each generator 10. It will be noted that this can prevent trip hazards from arising, since neighbouring tiles will move together.

In the arrangement of FIG. 2, when a user steps on the flooring system, each footstep will move the actuator 200 of one (e.g., if the footstep lands on a generator 10), two (e.g., if the footstep lands on the boundary between two neighbouring tiles 20), or three generators 10 (e.g., if the footstep lands in the middle of a tile 20).

Similarly, each tile 20 is supported by a plurality of actuators 200. Thus, a user stepping on a tile 20 can provide motion to each of the corresponding actuators 200, and thereby generate electricity via the corresponding plurality of generators 10. In doing so, each tile 20 will displace vertically and/or tilt by a small degree.

Each tile 20 is generally planar with a first major surface 21 and a second major surface 22. The first major surface 21 forms an upper surface in use. The second major surface 22 forms a lower surface in use.

The tiles 20 substantially tessellate to form collectively a substantially continuous floor surface. By "substantially" is meant that the tiles 20 do not meet exactly along each edge, but that a small gap is provided therebetween (to allow for relative rotation of neighbouring tiles 20). Furthermore each tile 20 meets at a generator 10, where a gap is provided between the multiple tiles 20 supported by that generator 10. The gaps along each edge and at each generator 10 are only small in comparison to the surface area of the floor surface taken up by the tiles 20, and so they can be said to substantially tessellate.

The major surface of each tile is generally shaped as a triangle (e.g., an equilateral triangle in some embodiments). By "generally shaped" is meant that the tile need not have perfectly sharp corners. Since the corners are only truncated by a small amount, they can be said to be generally triangular.

Each tile 20 is supported by exactly three generator actuators 200. That is, an actuator 200 may support each corner of a tile 20. The tiles 20 are biased by the biasing device acting on the actuators 200 to be flat and level when a user is not standing on the floor surface.

By using this arrangement of tiles 20, the possible degree of tilting of the tiles 20 may be larger than if other arrangements were used. For example, if a user steps on the corner of a square tile 20, the opposite corner could protrude by a corresponding displacement. However, with triangular tiles, the movement of one corner represents the rotation of the tile about one edge, and so undesirable deformations of the floor, such as producing trip hazards, can be avoided for equivalent displacements.

The longest dimension of each tile 20 is no more than 100 cm. The longest dimension of each tile is in the range 300 mm to 700 mm.

For a square tile 20, the longest dimension would correspond to the distance between to opposite corners.

In the context of a generally triangular tile 20, the longest dimension is the length of one edge. This substantially corresponds to the distance between actuators 200.

For the flooring system 1 to allow sufficient motion, each tile 20 may have a thickness T that is as small as possible. This also reduces the need to excavate a large space for installation. However, the tiles must carry the weight of a user and so they must be rigid and strong.

Further detail regarding the types of flooring system 1 in which the generator might be used is provided in the Applicant's co-pending UK patent application, GB 1516234.0.

The invention claimed is:

1. An electrical generator configured to convert axial kinetic energy into electrical energy, the electrical generator comprising:
    a housing;
    an actuator configured to be movable axially relative to the housing by an axial distance of between approximately 5 mm and approximately 10 mm;
    a rotatable member configured to be rotatable relative to the housing and configured to cooperate with the actuator such that axial movement of the actuator causes rotation of the rotatable member;
    a stator fixedly attached to the housing;
    a rotor configured to receive rotational kinetic energy from the rotatable member, wherein the rotor and the stator are configured to interact such that rotation of the rotor relative to the stator generates electromagnetic induction in the rotor and/or the stator which produces a three-phase alternating current;
    an electronic circuit including a rectifier, the electronic circuit configured to convert the alternating current to a direct current; and
    a current controller configured to regulate the direct current to generate a fixed constant current of between approximately 150 mA and approximately 500 mA.

2. The electrical generator of claim 1 wherein the electronic circuit includes a flyback converter.

3. The electrical generator of claim 1, wherein the electronic circuit includes a battery and a diode.

4. The electrical generator of claim 1, wherein the fixed constant current has a value in a range from approximately 350 mA to approximately 400 mA.

5. The electrical generator of claim 1, wherein the fixed constant current has a value that is approximately 350 mA.

6. The electrical generator of claim 1, wherein:
    the actuator is biased in a first direction and the rotatable member is configured to be rotatable relative to the housing on a rotation axis parallel to the first direction, and
    the rotatable member is configured to cooperate with the actuator such that movement of the actuator in a second direction opposite the first direction causes the rotatable member to rotate about the rotation axis.

7. The electrical generator of claim 6, wherein the first direction is a first axial direction and the second direction is a second axial direction opposite the first axial direction.

8. The electrical generator of claim 1, further comprising a flywheel between the rotatable member and the rotor.

9. The electrical generator of claim 1, wherein a first one of the actuator and the rotatable member includes a ball screw, and a second one of the actuator and the rotatable member includes a ball nut, and
    wherein the electrical generator includes a plurality of balls between the actuator and the rotatable member.

10. The electrical generator of claim 9, wherein the rotatable member includes a first helical groove and the actuator includes a second helical groove that complements the first helical groove such that the first and second helical grooves together form a helical channel having a circular cross section that is configured to accommodate the plurality of balls.

11. The electrical generator of claim 10, wherein each of the plurality of balls has a diameter that corresponds to a diameter of a circular cross section of the helical channel.

12. The electrical generator of claim 10, wherein the diameter of each of the plurality of balls is selected to minimize friction and to maximize conversion of axial to rotational movement.

13. The electrical generator of claim 10, further comprising a clutch arrangement between the rotatable member and the rotor.

14. The electrical generator of claim 13, wherein the clutch arrangement includes an overrunning clutch that allows continued rotation of the rotor by inertia after rotation of the rotatable member concludes.

15. The electrical generator of claim 13, wherein the clutch arrangement includes a sprag clutch:
    that allows transmission of torque from the rotatable member to the rotor when the rotatable member rotates in a first direction of rotation, and
    that prevents transmission of torque from the rotatable member to the rotor when the rotatable member rotates in a second direction of rotation opposite the first direction of rotation.

16. The electrical generator of claim 15, wherein:
    the actuator is biased in a first direction and the rotatable member is configured to be rotatable relative to the housing on a rotation axis that is parallel to the first direction,
    the rotatable member is configured to cooperate with the actuator such that movement of the actuator in a second direction, opposite the first direction, causes the rotatable member to rotate about the rotation axis,
    the first direction is a first axial direction and the second direction is a second axial direction opposite the first axial direction, and
    the first direction of rotation results from movement of the actuator in the second axial direction and the second direction of rotation results from movement of the actuator in the first axial direction.

17. The electrical generator of claim 13, wherein the clutch arrangement includes both an overrunning clutch and a sprag clutch either separately or as a single clutch.

* * * * *